United States Patent
Ranftl et al.

(10) Patent No.: US 11,945,392 B2
(45) Date of Patent: Apr. 2, 2024

(54) METAL-FIXING MATERIAL FEEDTHROUGH, METHOD FOR THE PRODUCTION THEREOF AND USES THEREOF

(71) Applicant: Schott AG, Mainz (DE)

(72) Inventors: Reinhard Ranftl, Pfeffenhausen (DE); Thomas Pfeiffer-Landshut, Kumhausen (DE); Susumu Nishiwaki, Koka (JP); Ondrej Rousek, Zamberk (CZ)

(73) Assignee: Schott AG, Mainz (DE)

( * ) Notice: Subject to any disclaimer, the term of this patent is extended or adjusted under 35 U.S.C. 154(b) by 625 days.

(21) Appl. No.: 17/110,753

(22) Filed: Dec. 3, 2020

(65) Prior Publication Data

US 2021/0188207 A1    Jun. 24, 2021

(30) Foreign Application Priority Data

Dec. 19, 2019    (EP) ..................... 19217780

(51) Int. Cl.
*B60R 21/217*    (2011.01)
*B60R 21/26*    (2011.01)
(Continued)

(52) U.S. Cl.
CPC ............ *B60R 21/217* (2013.01); *B60R 21/26* (2013.01); *B60R 22/4652* (2013.01);
(Continued)

(58) Field of Classification Search
CPC ... B60R 21/26; B60R 21/217; B60R 22/4652; B60R 2021/26029; C03C 27/00;
(Continued)

(56) References Cited

U.S. PATENT DOCUMENTS 3,202,782 A * 8/1965 Mathison ............... H01H 50/30
                                                           335/203
4,128,697 A * 12/1978 Simpson ................. H01L 23/10
                                                           257/E23.184
(Continued)

FOREIGN PATENT DOCUMENTS

DE    203 14 580 U1    9/2004
EP    0 586 133 A2    3/1994
(Continued)

OTHER PUBLICATIONS

European Search Report dated Jul. 23, 2020 for European Patent Application No. 19217780 (5 pages).
(Continued)

*Primary Examiner* — Timothy J Thompson
*Assistant Examiner* — Michael F McAllister
(74) *Attorney, Agent, or Firm* — Taylor IP, P.C.

(57)    ABSTRACT

A metal-fixing material feedthrough for at least one of an airbag igniter or a belt pre-tensioner includes a main body having a through opening formed therein and at least one metal pin fused into the through opening in a vitreous or glass ceramic fixing material. A surface of the vitreous or glass ceramic fixing material is a freely fused surface and lies in a same plane as an end face of the at least one metal pin.

21 Claims, 3 Drawing Sheets

(51) Int. Cl.
*B60R 22/46* (2006.01)
*C03C 27/00* (2006.01)
*C03C 27/02* (2006.01)
*F23Q 2/28* (2006.01)
*F23Q 7/00* (2006.01)
*H02G 3/04* (2006.01)

(52) U.S. Cl.
CPC ............. *C03C 27/00* (2013.01); *C03C 27/02* (2013.01); *F23Q 2/28* (2013.01); *F23Q 7/00* (2013.01); *H02G 3/0406* (2013.01); *B60R 2021/26029* (2013.01)

(58) Field of Classification Search
CPC .. C02C 27/02; F23Q 2/28; F23Q 7/00; H02G 3/0406
USPC ........................................................ 361/248
See application file for complete search history.

(56) References Cited

U.S. PATENT DOCUMENTS

| | | | | |
|---|---|---|---|---|
| 5,230,287 A * | 7/1993 | Arrell, Jr. | ............... | F42B 3/195 102/202.5 |
| 5,243,492 A * | 9/1993 | Marquit | ................... | F42B 3/11 280/736 |
| 5,431,101 A * | 7/1995 | Arrell, Jr. | ............... | F42B 3/195 102/202.5 |
| 5,672,841 A * | 9/1997 | Monk | ..................... | F42B 3/185 102/202.7 |
| 5,709,724 A * | 1/1998 | Naugler | ................... | C03C 27/02 65/59.4 |
| 5,798,476 A * | 8/1998 | Bailey | .................... | F42B 3/103 102/202.7 |
| 6,009,809 A * | 1/2000 | Whang | ................... | F42B 3/125 102/202.7 |
| 6,274,252 B1 * | 8/2001 | Naugler | ................... | C03C 27/02 403/30 |
| 6,357,355 B1 * | 3/2002 | Fogle, Jr. | ................ | F42B 3/188 102/202.7 |
| 7,124,688 B2 * | 10/2006 | Avetisian | ................ | F42B 3/198 102/202.7 |
| 7,267,056 B2 * | 9/2007 | Takahara | ................ | F42B 3/103 280/741 |
| 8,733,250 B2 * | 5/2014 | Fink | ........................ | F42B 3/103 102/202.7 |
| 8,908,728 B1 | 12/2014 | Huikai et al. | | |
| 9,335,133 B2 * | 5/2016 | Yamamoto | ................ | F42B 3/10 |
| 2002/0069782 A1 * | 6/2002 | Avetisian | ................ | F42B 3/125 102/202.7 |
| 2003/0221578 A1 * | 12/2003 | Forman | ................... | F42B 3/121 102/202.7 |
| 2004/0250542 A1 * | 12/2004 | Nishina | ................... | F42B 3/103 60/632 |
| 2006/0017269 A1 * | 1/2006 | Kuroda | ................... | B60R 21/26 280/741 |
| 2006/0260498 A1 * | 11/2006 | Hatomoto | ............... | F42B 3/103 102/530 |
| 2007/0187934 A1 * | 8/2007 | Fink | ........................ | F42B 3/103 280/737 |
| 2008/0148983 A1 * | 6/2008 | Oda | ........................ | F42B 3/198 102/202.9 |
| 2008/0250963 A1 * | 10/2008 | Fink | ........................ | F42B 3/198 102/202.8 |
| 2010/0181748 A1 * | 7/2010 | Nakamura | ............... | F42B 3/103 280/741 |
| 2010/0199872 A1 * | 8/2010 | Fink | ........................ | F42B 3/103 228/164 |
| 2012/0199036 A1 * | 8/2012 | Fink | ........................ | F42B 3/198 102/530 |
| 2019/0109071 A1 * | 4/2019 | Hartl | .................... | B23K 1/0008 |
| 2020/0010356 A1 * | 1/2020 | Fotheringham | ......... | C03C 3/112 |

FOREIGN PATENT DOCUMENTS

| | | |
|---|---|---|
| EP | 1 225 415 A1 | 7/2002 |
| EP | 1 813 906 A1 | 8/2007 |
| JP | 6-185897 A | 7/1994 |
| JP | 2010-84981 A | 4/2010 |
| WO | 00/73729 A1 | 12/2000 |

OTHER PUBLICATIONS

Notification under Article 94 dated Aug. 18, 2020 for European Patent Application No. 19217780 (4 pages).

* cited by examiner

METAL-FIXING MATERIAL FEEDTHROUGH, METHOD FOR THE PRODUCTION THEREOF AND USES THEREOF

CROSS REFERENCE TO RELATED APPLICATIONS

This application claims priority to European Patent Application No. 19217780.6 filed on Dec. 19, 2019, which is incorporated in its entirety herein by reference.

BACKGROUND OF THE INVENTION

1. Field of the Invention

The present invention relates to a metal-fixing material feedthrough, for feedthrough elements in general, e.g. for feedthroughs for sensors and/or large feedthroughs and/or feedthroughs in transistor outline housings and/or battery or capacitor feedthroughs, and to such feedthroughs themselves. In particular, feedthroughs for ignition devices of the kind used to ignite a pyrotechnic personal protection device, but especially those which can be used for airbag igniters and/or belt pre-tensioners and/or gas generators, are provided. In particular, the present invention relates to the configuration of the header of such feedthrough elements, to the method for the production thereof and to uses thereof.

2. Description of the Related Art

Feedthroughs of sensors can, in particular, supply sensor elements with power and/or transmit the signals thereof to evaluation units. Large feedthroughs are generally used in containment structures, e.g. in liquefied gas tanks and/or reactors.

Feedthroughs through the housings of batteries, including rechargeable batteries, or of capacitors are generally understood as battery or capacitor feedthroughs. The term likewise includes the area of supercapacitors, also referred to as supercaps. The feedthrough generally serves to make contact with electrodes in the interior of the battery or capacitor housing.

A transistor outline housing, also referred to as a TO housing, is a current-carrying electronics housing. Fundamentally, a TO housing comprises two components: a header and a cap. While the header primarily ensures the power supply to the encapsulated components, the cap in the region of the opto-electronics is used to reliably transmit optical signals. This comprises both the transmitters, e.g., laser diodes, and the receivers of optical signals, e.g., photodiodes. The TO header forms the mechanical basis for the mounting of electronic and optical components, e.g., semiconductors, laser diodes, and also a simple electric circuit. At the same time, it supplies the protected components with power by connection pins.

Airbags and/or belt pre-tensioners, in particular, are used as pyrotechnic personal protection devices in motor vehicles. Safety systems of this kind can considerably reduce the risk of injury. However, it is a prerequisite that the respective safety systems do not fail in the event of a collision. Particular attention here is directed especially also to the igniters of such pyrotechnic devices, which are indispensable to the functioning of a safety device of this kind. In particular, the igniters must also continue to operate correctly even many years after their production. 15 years is often given as the mean life of such igniters. In order to ensure permanently satisfactory operation, it must be ensured here that the propellant charge present in the igniter does not change in the course of time. Such changes can be caused by moisture penetrating into the igniter, for example. It is therefore important to hermetically seal the propellant charge of the igniter. The igniter must also release the gases of the ignited propellant charge in the correct direction to ignite the propellant charge of a gas generator of the safety system.

To ensure this, igniters known from the prior art have a cap or cover and a relatively solid header, between which the propellant charge is enclosed in a cavity formed by these parts. The current for igniting the propellant charge is passed through the header by electric connections. For this reason, the header generally has through openings, in which there are metal pins that can be supplied with electric current on one side by a plug connection and are connected on the other side, e.g., by an ignition bridge, which, in contact with the propellant, brings about the ignition of said propellant when current flows through. The header is therefore also generally referred to as a feedthrough element. In the design of the feedthrough element, it must be ensured that, when the propellant charge is ignited, the cap or cover or part thereof tears away from said charge in all cases and that the electric feedthroughs are not driven out of the header.

In the case of such feedthrough elements, the main body of the header is composed of metal, and the ignition bridge is formed by a welded-on bridge wire. In this embodiment, a metal pin is fixed as a pin in an electrically insulating fixing material in a through opening of the main body. A glass material, in particular a glass solder, is used as a fixing material. This metal pin is thereby insulated by glass with respect to the outer conductor. Ceramic, glass ceramic and/or polymers are likewise possible as insulating materials.

A second metal pin as a pin is welded or soldered to the outer conductor, which is represented by the main body, also referred to as the base plate. A bridge wire (generally composed of a tungsten alloy) thus comes into contact as an ignition bridge with the surface of the glass material on the upper side of the feedthrough element—that is the side which faces the ignition cap of the fully assembled ignition device. To ensure that the bridge wire is not damaged and the ignition element has a long life in use, e.g., in a motor vehicle, the surface of the glass material must generally be ground since roughness on the surface may damage the bridge wire.

Ignition devices of the abovementioned type are known from EP 1813906 B1, for example.

EP 0586133 A2 describes the production of metal-fixing material feedthroughs for airbag igniters, in which the contact pin is embedded in a glass material in the through opening, and the surface of the main body and of the fixing material is ground before the attachment of the bridge wire.

TO housings are illustrated in U.S. Pat. No. 8,908,728 B1, for example. Here, it is conceivable to connect an earth pin to the main body in order to electrically earth the main body.

What is needed in the art is a metal-fixing material feedthrough for a feedthrough element, in particular for igniters of airbags and/or belt pre-tensioners, in which the disadvantages of the prior art are avoided and grinding of the surface is avoided, and a method for production.

SUMMARY OF THE INVENTION

In some exemplary embodiments provided according to the present invention, a metal-fixing material feedthrough for an airbag igniter and/or a belt pre-tensioner includes a main body having a through opening formed therein and at least one metal pin fused into the through opening in a vitreous or glass ceramic fixing material. A surface of the vitreous or glass ceramic fixing material is a freely fused surface and lies in a same plane as an end face of the at least one metal pin.

In some exemplary embodiments provided according to the present invention, an ignition device includes a metal-fixing material feedthrough. The metal-fixing material feedthrough includes a main body having a through opening formed therein and at least one metal pin fused into the through opening in a vitreous or glass ceramic fixing material. A surface of the vitreous or glass ceramic fixing material is a freely fused surface and lies in a same plane as an end face of the at least one metal pin.

In some exemplary embodiments provided according to the present invention, a method for producing a metal-fixing material feedthrough having at least one metal pin that is fused into a through opening of a main body in a vitreous or glass ceramic fixing material that has a surface between the at least one metal pin and the main body is provided. The method includes fusing the at least one metal pin into the vitreous or glass ceramic fixing material by heating the vitreous or glass ceramic fixing material. The heated fixing material is freely fused at the surface.

In some exemplary embodiments provided according to the present invention, a method for producing a metal-fixing material feedthrough including at least one metal pin that is fixed in a through opening of a main body in a vitreous or glass ceramic fixing material that has a surface is provided. The method includes fixing the at least one metal pin in the vitreous or glass ceramic fixing material and the through opening such that the surface of the vitreous or glass ceramic fixing material is in a same plane as an end face of the at least one metal pin without grinding the surface of the vitreous or glass ceramic fixing material. The metal-fixing material feedthrough further includes a conductor resting on the surface of the vitreous or glass ceramic fixing material.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
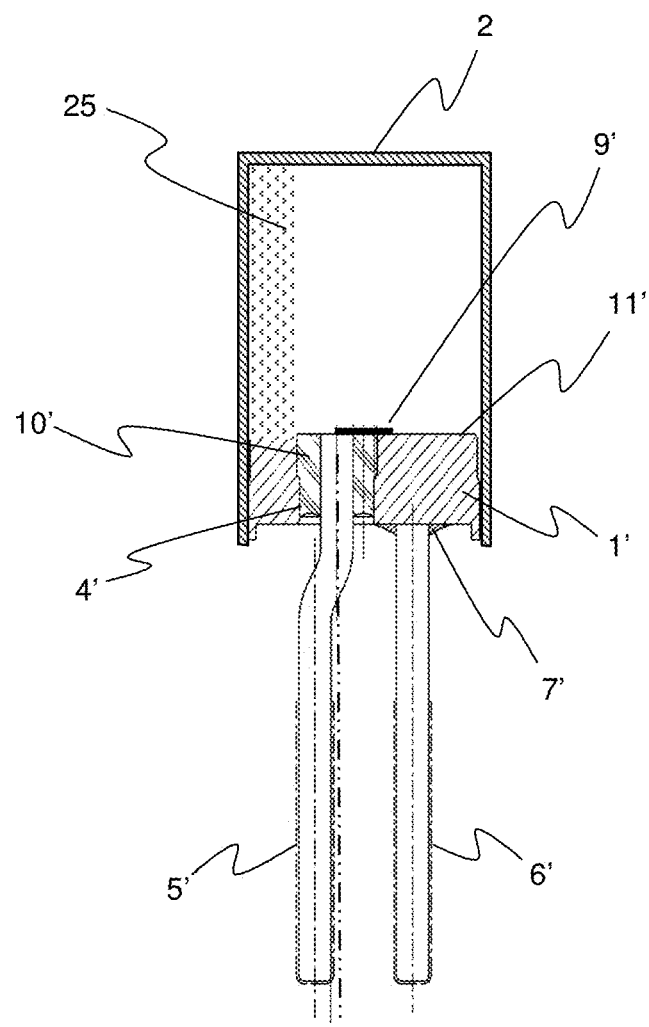
FIG. 1 illustrates a known ignition device comprising a metal-fixing material feedthrough according to the prior art, having a ground surface on which the ignition wire rests.

In some exemplary embodiments provided according to the present invention, a metal-fixing material feedthrough includes a main body, such as a metal main body, and at least one through opening, into which at least one metal pin is fused in an electrically insulating vitreous or glass ceramic fixing material and in this way fixed therein. The surface of the vitreous or glass ceramic fixing material is a freely fused surface, which may be free from open bubbles. For the purposes of the present invention, "freely fused" means that the surface forms spontaneously during the cooling of the melted glass material. Visually, it resembles fire-polished surfaces and, as such, is identifiable with the naked eye, especially since it may have a mirrored finish.

The surface of the freely fused fixing material lies in the same plane as the end face of the at least one metal pin which is fused into the fixing material. Of course, this refers to the end face of the metal pin which is closest to the fixing material and which is provided for connection to the conductor or ignition conductor, and consequently the upper side of the metal-fixing material feedthrough.

In the production of the metal-fixing material feedthrough, the starting point is generally a compact which is arranged together with the metal pin in the through opening and is then heated, with the result that the compact melts and joins to the main body and the metal pin. The compact is generally produced by pulverizing the glass or glass ceramic material, adding binders, which are usually organic, and pressing it into shape. It is likewise equally possible for the compact to be sintered before the metal pin is fused in. It is likewise possible for the glass ceramic material to be formed from the previously amorphous vitreous material during heating and/or cooling.

During the fusing in of the metal pin and connection to the main body, the binder is burnt out. The vitreous or glass ceramic fixing material in the through opening generally contains bubbles and has portions that protrude beyond the surface of the main body. The metal pin is likewise usually arranged in such a way that it projects beyond the surface of the main body. To obtain a flat surface that lies in one plane, it is therefore assumed that the surface must be ground flat.

In contrast, according to the present invention, the surface of the fixing material is freely fused during the melting process. In this case, the at least one metal pin is, in particular, also arranged in the through opening in such a way that the end face thereof is in the same plane as the surface of the main body. It has been found that free fusion results in a smooth surface of the vitreous or glass ceramic fixing material and that grinding is unnecessary.

In some embodiments, an electric conductor, in particular an ignition conductor, is mounted between the main body and the at least one metal pin, the conductor connecting the main body and the at least one metal pin in an electrically conductive manner. The surface of the fixing material is free from open bubbles, at least in the region of the conductor.

In some embodiments, the entire surface of the fixing material is free from open bubbles. However, it is also technically sufficient and provided according to the present invention if the entire surface of the fixing material is substantially free from melted-open bubbles, this being interpreted to mean a number of at most 5 open bubbles on the surface. These can be distributed over the surface, as described, but not in the region on which the ignition wire is present, i.e., in particular rests on the fixing material.

For the main body, it is customary to use normal steel, such as St 35 and/or St 37 and/or St 38, or high-grade steel and/or stainless steel as a material for the main body. High-grade steel according to DIN EN 10020 is a designation for alloyed or unalloyed steels, the sulfur and phosphorus content (referred to as iron accompanying elements) of which does not exceed 0.035%. Further heat treatments, e.g., hardening and tempering, are often provided according to this. High-grade steels include, for example, high-purity steels, in which components such as aluminum and silicon are separated out of the melt by a special production process, and furthermore also highly alloyed tool steels, which are provided for a subsequent heat treatment. Such steels contain chromium, in particular. The following may be used, for example: X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, X6CrNiMoTi17-12-2.

However, to ensure production efficiency of the implementation provided according to the present invention, the metal main body may also not be composed of a high-grade steel. Instead, the main body may be formed from a steel from the group comprising 1.01xx to 1.07xx (unalloyed quality steels). Here, the steel group is specified according to DIN EN 10 027-2, where the first digit indicates the main group of materials and the series of digits after the first point indicates the number of the steel group.

To ensure corrosion resistance, the main body can be coated with a metal. A nickel coating may be used. This applies especially to main bodies which are formed from unalloyed quality steels.

In some embodiments, the vitreous or glass ceramic fixing material is chosen so that the thermal expansion thereof is less than that of the metal main body. During melting and subsequent cooling, the main body shrinks as it were onto the solidified fixing material, with the result that a "compression feedthrough", also referred to as a "glass compression seal", is obtained. This means that the main body exerts an axial pressure on the fixing material, increasing its mechanical retaining force in the through opening.

In this way, a hermetically sealed metal-fixing material feedthrough is achieved.

It has been found that, with the procedure described above, particularly with the free fusion of the surface, the vitreous or glass ceramic fixing material may have bubbles in its volume with a proportion of bubbles BV but, at its surface, has a glass skin which has a proportion of bubbles that is considerably smaller than BV. The glass skin may be substantially bubble-free, meaning that there are at most 5 bubbles, or is even completely bubble-free. In particular, the glass skin and/or the surface of the fixing material is bubble-free in the region on which the ignition wire rests.

By virtue of the fact that the fixing material has a freely fused surface, the roughness thereof is less than in the case of the previously ground metal-fixing material feedthroughs. In particular, the mean roughness Ra of the surface of the vitreous or glass ceramic fixing material is less than 0.1 µm, in particular in a range of from 0.02 µm to 0.05 µm. In contrast, conventional Ra values in the case of the previous ground metal-fixing material feedthroughs are between 0.2 µm and 0.5 µm. The higher roughness values of the previous ground fixing material generally result from the remaining traces of grinding, particularly in the form of score marks.

The mean roughness Ra is defined by DIN EN ISO 4287:2010 and is determined in a manner known to a person skilled in the art. The average roughness or mean roughness Ra indicates the mean distance between a measurement point within a vertical section, i.e., the profile of the microstructure, and the mean line. Within the reference section, the mean line intersects the actual profile in such a way that the sum of the profile deviations (relative to the mean line) is reduced to a minimum. The mean roughness Ra thus corresponds to the arithmetic mean of the deviation of the absolute values from the mean line.

In comparison with the prior art, the smoother surface of the metal-fixing material feedthrough provided according to the present invention furthermore has the advantage that the risk of damage to the bridge wire is reduced when the latter is resting on the fixing material. In airbag igniters or belt pre-tensioners, the bridge wire is in contact with the ignition material, which is often in powder form. Even if the grain size of the powder is usually greater than the score marks of the traces of grinding, powder abrasion and thus very fine grains can be formed in the course of the product life, and these can wedge into the score marks below the bridge wire and can thus exert mechanical stress on said wire. This is avoided by the metal-fixing material feedthrough provided according to the present invention.

In some embodiments, the main body is designed in such a way that there is a continuous transition from the surface of the main body to the inner wall of the through opening, such as with an increasing gradient in a direction towards the inner wall of the through opening. A continuous transition means that, if the section through this region is understood as a curve, the first derivative of this curve has a continuous profile. In contrast, the main bodies from the prior art have a sharp bend, and therefore the first derivative of the section thereof is discontinuous. Such embodiments have the advantage that the main body can be produced easily by forming and/or stamping methods, especially the through opening, without the need to employ additional finishing steps to achieve right angles. Another advantage of this configuration of the main body is that the volume of the compact, which is responsible for the filling level of the fixing material in the through opening, is less critical in respect of volume fluctuations. This means that, for a given volume fluctuation, the filling level in the through opening changes less than the diameter of the fixing material, which is less critical for the mounting of the bridge wire than any step of the kind that would result from insufficient filling.

The continuous transition furthermore has the effect that there is a thin layer of fixing material on the region that falls gently towards the through opening. Surprisingly, it has been found that, although this is a glass compression seal, there is no flaking of the fixing material to be seen.

In some embodiments, there is a trough between the inner wall of the through opening and the vitreous or glass ceramic fixing material, in the region of the surface thereof. In general, a trough represents a depression in the surface of the fixing material. The width B of the trough may be at most 0.13 mm, such as from 0.005 mm to 0.13 mm or from 0.01 to 0.13 mm. The depth T of this trough may be at most 0.03 mm, such as at most 0.015 mm or between 0.05 mm and 0.025 mm.

The formation of the trough can be promoted by the previously described configuration of the transition of the surface of the main body to the inner wall of the through opening, i.e., this configuration and the presence of the trough interact in an advantageous manner.

The presence of the trough has the advantage that it is possible to achieve a stop for film coating of the surface of the fixing material and/or the surface of the main body, such as during the operation of the metal-fixing material feedthrough. Such films can be, for example, aqueous films and/or coatings which can occur during long-term operation and, in the worst case, can lead to reduced transfer resistance, short-circuits and/or electrochemical corrosion and thus to damage of the component comprising the metal-fixing material feedthrough.

In some embodiments, the trough can form spontaneously during the melting of the fixing material and the subsequent cooling thereof. It is surmised that this is a consequence of the adhesion and wetting properties of the vitreous or glass ceramic fixing material. It is likewise possible to stamp the trough in while the heated fixing material is still capable of being shaped.

Exemplary embodiments in which the vitreous or glass ceramic fixing material rests against and/or on the surface of the at least one metal pin without the formation of a trough can be advantageous. This means that the previously described trough is present only in the region of the transition from the fixing material to the main body and not in the region of the transition from the fixing material to the metal pin. This can be achieved, for example, if the radius of the optionally present rounding on the metal pin, i.e., at the transition from the end face to the lateral surface thereof, is smaller than the radius of the transition of the main body from the surface thereof to the inner wall of the through opening.

As previously described, it is possible for the trough to serve as a stop for disruptive films coating the surface, which can have an effect on the electric behavior of the electric conductor, in particular the ignition behavior. On the other hand, the trough may be dimensioned in such a way that no disruptive large particles can jam between it and the electric conductor, thus possibly mechanically overstressing the conductor.

In particular, the metal pin is arranged in such a way that the upper side, i.e., the flat end face of the metal pin, is in the same plane as the surface of the vitreous or glass ceramic fixing material. The metal pin may be rounded, that is to say, in particular, the transition between the upper side of the metal pin and the side wall thereof is rounded, wherein the transition point between this rounding and the side wall is situated below the surface of the vitreous or glass ceramic fixing material.

In some embodiments, the trough is circumferential, especially circular. The through opening may be of circular design in plan view, and the trough follows the inner wall of the through opening in a circle, optionally with a spacing.

In some embodiments, a metal-fixing material feedthrough in which an electric conductor, such as a wire conductor, in particular an ignition conductor, is mounted between the main body and the at least one metal pin, the conductor connecting the main body and the at least one metal pin in an electrically conductive manner. The conductor rests at least in some region or regions on the surface of the vitreous or glass ceramic fixing material and may bridge the trough. There is a free space below the conductor in this region in which the trough is bridged. It is likewise possible to fill and/or coat this free space, e.g., with a plastic, in particular a hydrophobic plastic or a plastic with a hydrophobic surface. As described, the trough can serve as a separation edge, such as for electrically conductive coatings or corrosive films. The circumferential edge shields the fixing material and/or the at least one metal pin as it were from these coatings and/or films.

In some embodiments, the main body is composed of a steel, such as stainless high-grade steel, at least at the interface with the vitreous or glass ceramic fixing material. The at least one metal pin may likewise be composed of a steel, such as stainless high-grade steel, at least at the interface with the vitreous or glass ceramic fixing material. It may be advantageous if the steel and/or high-grade steel is subject to wetting and/or adhesion in relation to glass, which at least assists the formation of the trough.

It may be advantageous if the upper side of the metal pin is in the same plane as the surface of the vitreous or glass ceramic fixing material. In particular, the transition between the upper side of the metal pin and the side wall thereof can be rounded, wherein the transition point between this rounding and the side wall is situated below the surface of the vitreous or glass ceramic fixing material. The rounding is therefore as it were brought within the fixing material. As compared with a sharp transition, where the side wall of the metal pin intersects the surface thereof directly and perpendicularly, this has the advantage that the probability of cracking at the interface between the metal pin and the fixing material is reduced.

As described, the upper side of the metal pin, i.e., the end face thereof, is in the same plane as the surface of the vitreous or glass ceramic fixing material. In particular, the transition between the upper side of the metal pin and the side wall thereof can be rounded, wherein the transition point between this rounding and the side wall is situated below the surface of the vitreous or glass ceramic fixing material. The rounding is therefore as it were brought into the fixing material. As compared with a sharp transition, where the side wall of the metal pin intersects the surface thereof directly and perpendicularly, this has the advantage that the probability of cracking at the interface between the metal pin and the fixing material is reduced.

In some embodiments, an electric conductor, such as an ignition conductor, is mounted between the main body and the at least one metal pin, the conductor connecting the main body and the at least one metal pin in an electrically conductive manner. This is usually welded on. This conductor rests at least in some region or regions on the surface of the vitreous or glass ceramic fixing material. In particular, it bridges the previously described trough.

Exemplary embodiments provided according to the present invention also provide a method for producing a metal-fixing material feedthrough, such as for igniters of airbags and/or belt pre-tensioners, having at least one metal pin, which is fused into a through opening of a main body in a vitreous or glass ceramic fixing material by heating and subsequent cooling, which has a surface between the at least one metal pin and the main body. During the fusing of the at least one metal pin into the vitreous or glass ceramic fixing material, the heated fixing material is freely fused at the surface thereof.

During this process, the fixing material forms a glass bond with the inner wall of the through opening and the outer wall of the at least one metal pin.

All the features described previously in respect of the metal-fixing material feedthrough can also be applied to the method.

The method includes some of the overall production steps for a feedthrough and/or an airbag igniter or belt pre-tensioner.

During free fusion, a substantially bubble-free surface of the fixing material may be formed, such as spontaneously. "Substantially bubble-free" means at most 5 bubbles on the surface, which also encompasses complete freedom from bubbles. The mean roughness Ra of the surface of the vitreous or glass ceramic fixing material may be less than 0.1 µm, such as Ra being in a range of from 0.015 µm to 0.055 µm or from 0.02 µm to 0.05 µm. In some embodiments, the vitreous or glass ceramic fixing material rests against the surface of the at least one metal pin without the formation of a trough. This means that it may be advantageous for the trough to be present between the main body and the fixing material but not between the fixing material and the metal pin.

In plan view, the through opening itself may be of circular design, and the trough may follow the inner wall of the through opening in a circle. A circular through opening can be obtained by stamping and/or forming. However, drilling and other suitable methods are likewise possible.

As previously described, producing the main body and/or the through opening by forming and/or stamping may be an advantageous method. As an efficient method in terms of materials, the main body can be produced by forming, wherein the at least one through opening is stamped out.

It may be advantageous if the main body is shaped in such a way that there is a continuous transition from the surface of the main body to the inner wall of the through opening, such as with an increasing gradient in a direction towards the inner wall of the through opening. This corresponds as it were to rounding with a progressive slope. This shape can be produced during the process of stamping the through opening.

In some embodiments, a trough is formed spontaneously between the inner wall of the through opening and the vitreous or glass ceramic fixing material, in the region of the surface thereof, during the heating and/or cooling. Alternatively, this is stamped in, e.g., by a punching or embossing tool. The trough may have a width B, which may be at most 0.13 mm. In some embodiments, the depth T of the trough is at most 0.03 mm, such as at most 0.015 mm or the depth T is between 0.05 mm and 0.025 mm.

It is likewise possible to stamp the trough in or produce it by the removal of material using suitable tools, e.g., punches.

In the further processing, an electric conductor can be mounted as described between the metal pin and the surface of the main body, such as by being welded on.

It is likewise often common practice for at least one further conductor, such as a metal pin, to be connected in an electrically conductive manner to the main body. This is usually an earth or ground conductor. The described electrically conductive connection between a metal pin and the main body is usually a soldered joint. It is likewise possible to weld this conductor to the main body.

Exemplary uses of the metal-fixing material feedthrough provided according to the present invention and/or of the result of the method provided according to the present invention are in airbag igniters and/or belt pre-tensioners and/or gas generators.

In the case of airbag igniters and/or belt pre-tensioners and/or gas generators, the metal pin fixed in the through opening, as well as the earth pin soldered to the main body, are usually coated with gold along their axis, at least in partial regions. The gold coating ensures permanent insensitivity to corrosion and permanent contact. The metal pins are often coated with gold in the end regions thereof. In this way, that region of the metal pin which is within the plug connection during assembly for the use of the ignition device may be gold-plated. In this way, it is possible to reduce the transfer resistances in the plug contact.

In some embodiments, at least two metal pins are connected to one another in an electrically conductive manner by an ignition bridge on the side of the main body facing the propellant. The ignition bridge can be formed by the ignition wire previously described.

As described previously, the roughness of the fixing material surface or rather, for purposes of the present invention, smoothness, can be characterized by the mean roughness Ra. The averaged peak to valley height Rz can likewise be specified, as known to a person skilled in the art.

In tests, which likewise represent exemplary embodiments, the metal-fixing material feedthrough described was produced by the previously described method, and the roughness of the fixing material surface, which is freely fused according to the present invention, was determined. As a comparison, the measured values for fixing material surfaces ground in accordance with the prior art are likewise indicated in Table 1. Tactile measurement by a Hommel probe, which is known to a person skilled in the art, was used as a measurement method.

TABLE 1

Roughness measurements on freely fused fixing material surface

| Measurement No. | According to the present invention: freely fused fixing material surface | | | Prior art: ground fixing material surface | | |
|---|---|---|---|---|---|---|
| | Ra [gm] | Rmax [gm] | Rz [gm] | Ra [gm] | Rmax [gm] | Rz [gm] |
| 1 | 0.032 | 0.301 | 0.249 | 1.206 | 15.524 | 9.217 |
| 2 | 0.030 | 0.293 | 0.235 | 0.905 | 14.364 | 9.974 |
| 3 | 0.024 | 0.275 | 0.192 | 0.679 | 11.667 | 7.082 |
| 4 | 0.023 | 0.662 | 0.261 | 0.954 | 11.466 | 9.286 |
| 5 | 0.024 | 0.178 | 0.166 | 1.174 | 14.079 | 8.915 |
| 6 | 0.023 | 0.200 | 0.168 | | | |
| Mean value: | 0.026 | | 0.212 | 0.984 | | 8.895 |

Referring now to the drawings, FIG. 1 illustrates an ignition device known from the prior art for a pyrotechnic protection device, in this case an airbag igniter as an example. In this case, FIG. 1 shows, in particular, a sectional view of a metal-fixing material feedthrough. The metal-fixing material feedthrough comprises a metal carrier part having a main body 1', which here has a disc-shaped basic shape. Basic shapes with an open area are likewise known and may be utilized according to the present invention. The metal-fixing material feedthrough provided according to the present invention is often also referred to as a header element, or header for short. A metal pin 5' is furthermore arranged as a functional element in a through opening 4' in the main body 1'. Here, the through opening 4' was stamped out of the main body 1'. The metal pin 5' is used to apply an electric current to an ignition bridge 9', via which a propellant charge 25 enclosed in the finished igniter is ignited. The ignition bridge 9' rests on an upper side 11' of the main body 1'. The side facing the propellant charge 25 is referred to as the upper side. The ignition device is closed by a cap 2, which, together with the main body 1', forms a cavity to accommodate the propellant charge 25. The cap 2 is usually welded to the main body 1'.

In the prior art, the current feedthrough in the through opening 4' is embodied, in particular, as a glass-metal feedthrough, wherein glass is used as a fixing material 10' between the metal pin 5' and the wall of the through opening 4' in the metal main body 1'. It is likewise possible to use high-performance polymers or other suitable materials in the through opening, as well as glass ceramic materials.

In the example shown in FIG. 1, the through opening 4' is arranged eccentrically with respect to the axial center line of the main body 1'. This ensures that there is sufficient space available to secure a second metal pin 6', even if the main body 1' has a small radius. The second metal pin 6' is butt-soldered to the main body 1' by a soldered joint and thus serves as an earth pin 6'. Metallic soldering materials, such as hard solder, are used as a soldering material 7'. The soldering material 7' forms a meniscus between the surface of the main body 1' and the earth pin 6'.

Figure 2:
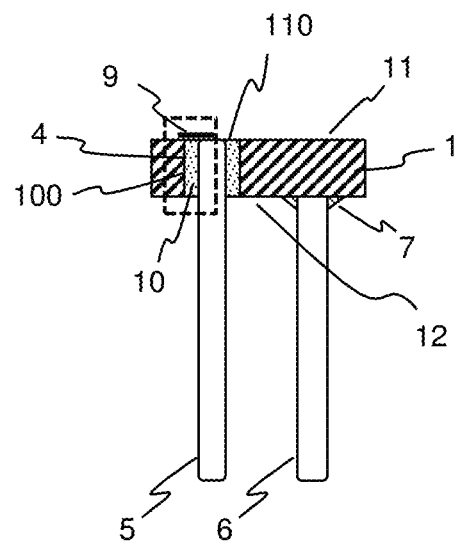
FIG. 2 illustrates a section through a metal-fixing material feedthrough provided according to the present invention, parallel to an axial center line thereof.

In contrast, FIG. 2 shows the section through a metal-fixing material feedthrough provided according to the present invention, parallel to the axial center line thereof through the latter, that can be used in place of the feedthrough illustrated in FIG. 1. A main body 1 has a first surface 11, in this case the upper side, and a second surface 12, in this case the lower side, which in some embodiments extends parallel to the upper side 11. The upper side 11 usually faces a propellant charge 25, and the electric contacts are usually made on the lower side 12. The metal main body 1 has a through opening 4, through which a metal pin 5 is passed as a pin. The through opening 4 can be stamped out of the main body 1. In this example, the outer contour of the main body 1 was likewise stamped out of a sheet metal strip, and therefore the entire main body 1 here represents a stamping. In some embodiments, the main body 1 is produced by cold forming from a wire material. The metal pin 5 is fused, i.e., fixed, in the through opening 4 as a first pin, also referred to as a contact pin, by a vitreous or glass ceramic fixing material 10 in a manner electrically insulated from the main body 1.

The first metal pin 5 is glass-sealed in the first through opening 4 of the metal main body 1, such as in a hermetically sealed manner. The vitreous or glass ceramic fixing material 10 of this metal-fixing material feedthrough is completely surrounded by the material of the main body 1, which represents the outer conductor.

The vitreous or glass ceramic fixing material 10 may have a lower thermal coefficient of expansion than the metal of the main body 1, with the result that, during cooling after the glass-sealing of the metal pin 5 into the fixing material 10, the main body 1 is as it were shrunk onto the material and thus the glass-metal feedthrough and, in this way, exerts a permanent mechanical pressure on the feedthrough and on the fixing material 10. In this way, a particularly leak-tight and mechanically stable connection is created between the metal pin 5, the fixing material 10 and the main body 1. This arrangement is referred to as glass compression sealing and may be used for airbag igniters, for example. Likewise possible and provided according to the present invention is the use of glass materials and/or glass ceramic materials.

A surface 110 of the fixing material 10 on the upper side 11 of the main body 1 is a freely fused surface and is in the same plane as an end face 50 of the fused-in metal pin 5 and may also be in the same plane as the upper side 11 of the main body 1. As previously described, the freely fused surface 110 may be characterized by a glass skin 40, which has a reduced proportion of bubbles in comparison with the volume of the fixing material 10, such as no open bubbles at the surface 110 thereof, at least in the region of an ignition conductor 9.

The ignition conductor 9 rests on the surface 110 of the fixing material 10 and is welded both to the metal pin 5 and the main body 1, i.e., to the end face 50 of the metal pin 5 and the surface 110 of the main body 1. A trough 55 is not illustrated in FIG. 2, but is illustrated in FIGS. 3 and 4.

A second metal pin 6 is connected as an earth pin to the main body 1 by soldering material 7.

Figure 3:
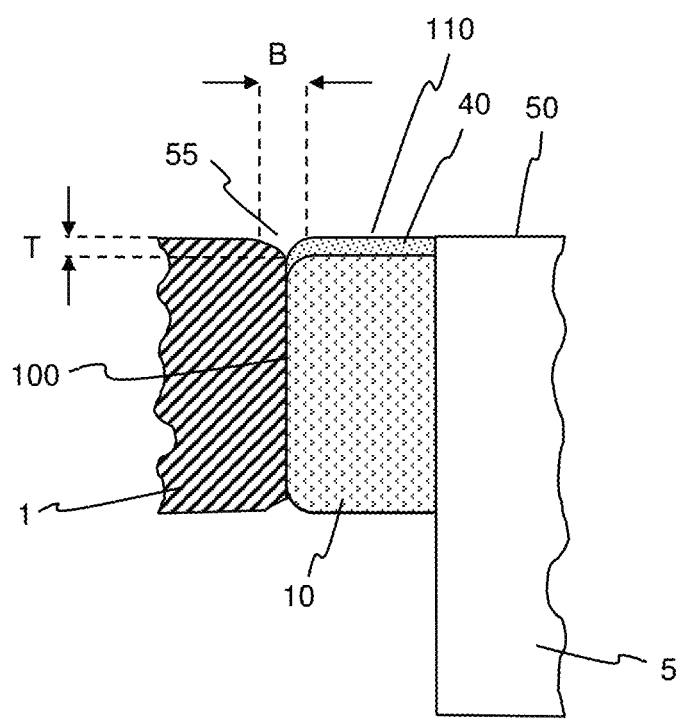
FIG. 3 illustrates a detail from FIG. 2.
Figure 4:
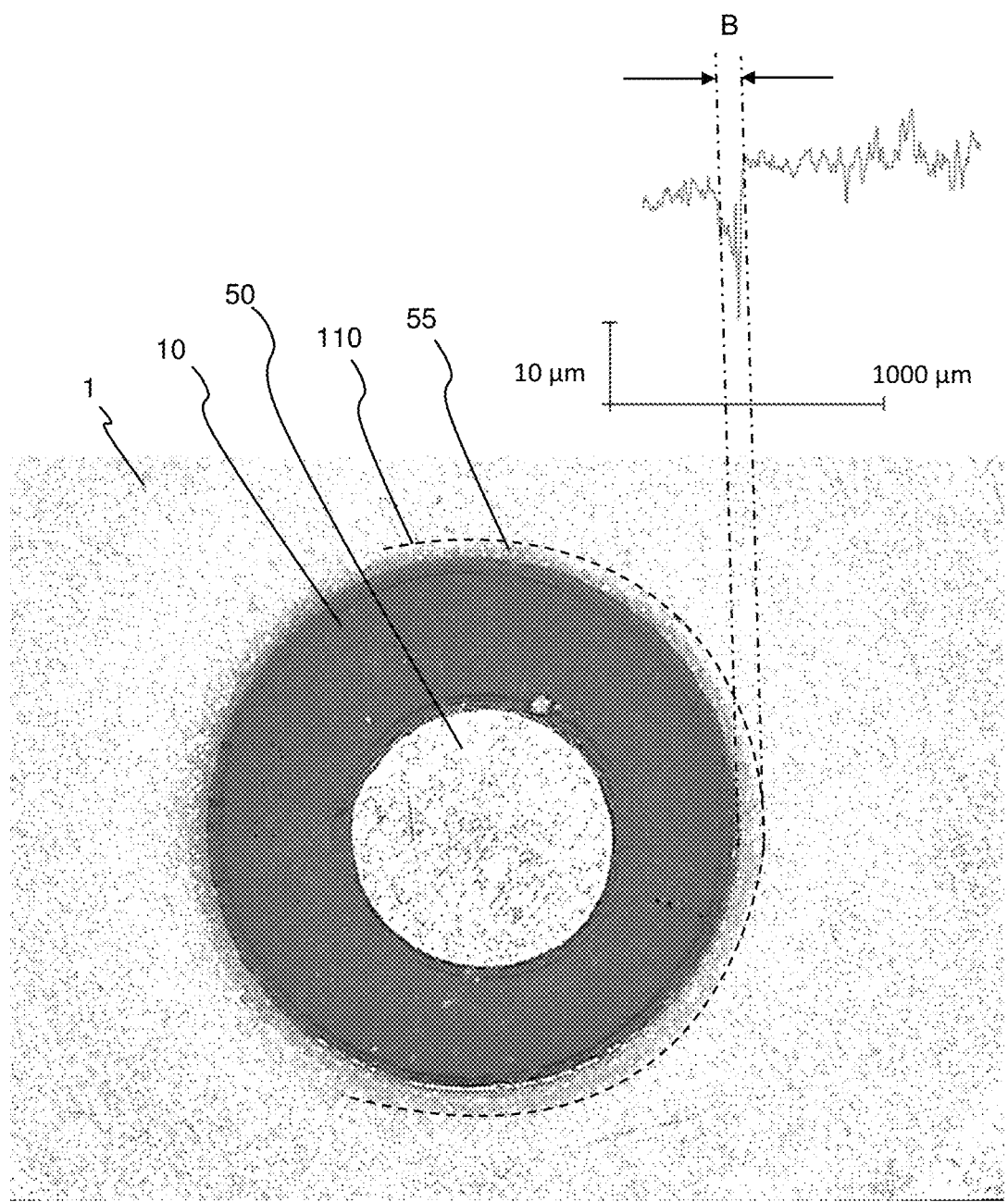
FIG. 4 shows a photographic image of a plan view of a metal-fixing material feedthrough provided according to the present invention and the measurement curve for the measurement of the trough.

FIG. 3 shows a detail from FIG. 2, which is illustrated as a broken rectangle in FIG. 2. This corresponds to an enlargement in the region of the main body 1, the fixing material 10, and the end face 50 of the metal pin 5. For the sake of simplicity, the ignition wire 9 is not illustrated.

However, the trough 55 situated between the main body 1 and the fixing material 10 is visible in FIG. 3. The trough 55 has a width B and a depth T. The trough 55 can be designed as a meniscus-shaped molding of the fixing material 10 onto the main body 1. The width B of the trough 55 may be at most 0.13 mm, such as from 0.005 mm to 0.13 mm or from 0.01 to 0.13 mm, and a depth T of at most 0.03 mm, such as at most 0.015 mm, or between 0.025 mm to 0.05 mm.

The radius of the transition between the surface 11 of the main body 1 and an inner wall 100 of the through opening can be larger than the radius of the transition between the outer wall of the fused-in metal pin 5 and the end face 50 thereof. For the sake of simplicity, this radius is not illustrated in FIG. 3. However, this relationship contributes, in particular, to the fact that the trough 55 is present at the transition to the main body 1 but not at the transition to the metal pin 5.

Likewise illustrated in FIG. 3 is the glass skin 40, which has a significantly smaller proportion of bubbles than the volume of the fixing material 10. In FIG. 3, there is a glass skin 40 on the upper side 11 of the metal-fixing material feedthrough. In some embodiments, there is also a glass skin on the lower side 12. This may be the case if the fixing material 10 is also freely fused on the lower side 12.

The glass skin 40 is visible by optical methods, such as by a microscope, even though its thickness may be in the range of a layer of atoms.

The inner wall 100 of the through opening 4 is in direct contact with the fixing material 10, and the fixing material 10 is glass-bonded to the inner wall 100. It is likewise possible for there to be a glass skin with a reduced proportion of bubbles between the inner wall 100 of the through opening 4 and the fixing material 10. The same applies to the interface between the fixing material 10 and the outer wall of the metal pin 5.

FIG. 4 shows a photographic image of the plan view of a metal-fixing material feedthrough provided according to the present invention and the measurement curve for the measurement of the trough 55. The through opening is of circular design and is filled with the fixing material 10. The metal pin 5 is glass-sealed therein, and its end face 50 is visible. The inner wall 110 of the through opening is especially emphasized by the dashed line. As described, this is an unground surface, and the fixing material surface is freely fused. No open bubbles are identifiable. The glass skin is as it were smooth or sealed.

Likewise illustrated is the measurement of the trough 55 in respect of the depth T and width B thereof. The measurement was performed by a digital measuring microscope. Hitherto, metal-fixing material feedthroughs, especially in the industrial mass production thereof for airbag igniters and/or belt pre-tensioners, have been ground on their upper side, wherein both the metal and the fixing material surface are ground. A cleaning step is then usually performed. In contrast, the metal-fixing material feedthroughs provided according to the present invention have the advantage that their fixing material surface is freely fused. The consequence of this is that the metal surface is unground, and processing steps can be eliminated. Furthermore, the vitreous or glass ceramic fixing material provided according to the present invention has the property of forming an at least largely bubble-free surface during the free fusing process, thus significantly reducing the risk of open bubbles. Open bubbles should be avoided since they are unwanted during the mounting of an ignition wire.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SIGNS

1' Main body
2 Cap
4' Through opening
5' Functional element, $1^{st}$ metal pin
6' Conductor, $2^{nd}$ metal pin, earth pin
7' Metallic soldering material
9' Bridge wire, ignition conductor
10' Electrically insulating fixing material
11' Surface of the main body, upper side
25 Propellant charge
1 Main body
4 Through opening
5 Functional element, $1^{st}$ metal pin
6 Conductor, $2^{nd}$ metal pin, earth pin
7 Metallic soldering material
9 Bridge wire, ignition conductor
10 Electrically insulating fixing material
11 Surface of the main body, upper side
12 Surface of the main body, lower side
50 End face of the $1^{st}$ metal pin
55 Trough
40 Glass skin
100 Inner wall of the through opening
110 Surface of the fixing material
B Width of the trough
T Depth of the trough

What is claimed is:

1. A metal-fixing material feedthrough for at least one of an airbag igniter or a belt pre-tensioner, comprising:
a main body having a through opening formed therein; and
at least one metal pin fused into the through opening in a vitreous or glass ceramic fixing material, a surface of the vitreous or glass ceramic fixing material being a freely fused surface and lying in a same plane as an end face of the at least one metal pin, a mean roughness Ra of the surface of the vitreous or glass ceramic fixing material according to DIN EN ISO 4287 being less than 0.1 μm or being in a range of from 0.015 μm to 0.05 μm.

2. The metal-fixing material feedthrough of claim 1, further comprising a conductor mounted between the main body and the at least one metal pin, the conductor connecting the main body and the at least one metal pin in an electrically conductive manner, and the freely fused surface of the vitreous or glass ceramic fixing material is free from open bubbles in the region of the conductor.

3. The metal-fixing material feedthrough of claim 1, wherein the vitreous or glass ceramic fixing material has, in its volume, bubbles with a proportion of bubbles BV and, at its surface, a glass skin that at least one of has a proportion of bubbles which is smaller than BV, has at most 5 bubbles, or is bubble-free.

4. The metal-fixing material feedthrough of claim 1, wherein there is a continuous transition from the surface of the main body to an inner wall of the through opening.

5. The metal-fixing material feedthrough of claim 4, wherein the continuous transition has an increasing gradient in a direction towards the inner wall of the through opening.

6. The metal-fixing material feedthrough of claim 1, further comprising a trough between an inner wall of the through opening and the vitreous or glass ceramic fixing material in a region of the surface.

7. The metal-fixing material feedthrough of claim 6, wherein at least one of:
the trough has a width which is at least one of at most 0.13 mm or from 0.005 mm to 0.13 mm; or
the trough has a depth which is at least one of at most 0.03 mm, at most 0.015 mm, or between 0.025 mm and 0.05 mm.

8. The metal-fixing material feedthrough of claim 6, wherein the through opening is of circular design in plan view and the trough follows the inner wall of the through opening in a circle.

9. The metal-fixing material feedthrough of claim 6, further comprising a conductor mounted between the main body and the at least one metal pin, the conductor connecting the main body and the at least one metal pin in an electrically conductive manner, wherein the conductor rests at least in some region or regions on the surface of the vitreous or glass ceramic fixing material and bridges the trough.

10. The metal-fixing material feedthrough of claim 6, wherein the main body is composed of a steel at least at an interface with the vitreous or glass ceramic fixing material; wherein the steel of the main body is subject to at least one of wetting or adhesion in relation to glass, which at least assists formation of the trough.

11. The metal-fixing material feedthrough of claim 10, wherein the least one metal pin is composed of a steel at least at an interface with the vitreous or glass ceramic fixing material.

12. The metal-fixing material feedthrough of claim 1, wherein the vitreous or glass ceramic fixing material rests against a surface of the at least one metal pin without forming a trough.

13. An ignition device, comprising:
a metal-fixing material feedthrough comprising:
a main body having a through opening formed therein; and
at least one metal pin fused into the through opening in a vitreous or glass ceramic fixing material, a surface of the vitreous or glass ceramic fixing material being a freely fused surface and lying in a same plane as an end face of the at least one metal pin, a mean roughness Ra of the surface of the vitreous or glass ceramic fixing material according to DIN EN ISO 4287 being less than 0.1 µm or being in a range of from 0.015 µm to 0.05 µm.

14. The ignition device of claim 13, further comprising a cap coupled to the main body to form a cavity and a propellant charge disposed in the cavity.

15. The ignition device of claim 13, further comprising a conductor mounted between the main body and the at least one metal pin, the conductor connecting the main body and the at least one metal pin in an electrically conductive manner, and the freely fused surface of the vitreous or glass ceramic fixing material is free from open bubbles in the region of the conductor.

16. The ignition device of claim 13, wherein the vitreous or glass ceramic fixing material has, in its volume, bubbles with a proportion of bubbles BV and, at its surface, a glass skin that at least one of has a proportion of bubbles which is smaller than BV, has at most 5 bubbles, or is bubble-free.

17. The ignition device of claim 13, further comprising a trough between an inner wall of the through opening and the vitreous or glass ceramic fixing material in a region of the surface.

18. The ignition device of claim 17, further comprising a conductor mounted between the main body and the at least one metal pin, the conductor connecting the main body and the at least one metal pin in an electrically conductive manner, wherein the conductor rests at least in some region or regions on the surface of the vitreous or glass ceramic fixing material and bridges the trough.

19. The ignition device of claim 18, wherein the vitreous or glass ceramic fixing material has, in its volume, bubbles with a proportion of bubbles BV and, at its surface, a glass skin that at least one of has a proportion of bubbles which is smaller than BV, has at most 5 bubbles, or is bubble-free.

20. A method for producing a metal-fixing material feedthrough having at least one metal pin that is fused into a through opening of a main body in a vitreous or glass ceramic fixing material that has a surface between the at least one metal pin and the main body, the method comprising:

fusing the at least one metal pin into the vitreous or glass ceramic fixing material by heating the vitreous or glass ceramic fixing material, the heated fixing material being freely fused at the surface, a mean roughness Ra of the surface of the vitreous or glass ceramic fixing material according to DIN EN ISO 4287 being less than 0.1 µm or being in a range of from 0.015 µm to 0.05 µm.

21. A method for producing a metal-fixing material feedthrough comprising at least one metal pin that is fixed in a through opening of a main body in a vitreous or glass ceramic fixing material that has a surface, the method comprising:

fixing the at least one metal pin in the vitreous or glass ceramic fixing material and the through opening such that the surface of the vitreous or glass ceramic fixing material is in a same plane as an end face of the at least one metal pin without grinding the surface of the vitreous or glass ceramic fixing material, the metal-fixing material feedthrough further comprising a conductor resting on the surface of the vitreous or glass ceramic fixing material.

* * * * *